(12) United States Patent
You et al.

(10) Patent No.: US 7,689,116 B2
(45) Date of Patent: Mar. 30, 2010

(54) THINNER MOBILE CAMERA OPTICAL LENS SYSTEM AND IMAGE FORMING METHOD USING THE SAME

(75) Inventors: Ho Sik You, Gyeonggi-do (KR); Seok Ho Song, Seoul (KR); Ho Seop Jeong, Gyeonggi-do (KR); Sang Hyuck Lee, Gyeonggi-do (KR); Hye Ran Oh, Gyeonggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 436 days.

(21) Appl. No.: 11/498,782

(22) Filed: Aug. 4, 2006

(65) Prior Publication Data
US 2007/0036537 A1   Feb. 15, 2007

(30) Foreign Application Priority Data
Aug. 10, 2005   (KR) .................. 10-2005-0073384

(51) Int. Cl.
*G03B 41/00* (2006.01)

(52) U.S. Cl. .............. 396/322; 396/324; 396/326; 396/331; 396/332; 396/333; 359/462; 359/464; 359/627; 348/340; 348/369

(58) Field of Classification Search .......... 396/322, 396/331, 324, 326, 332, 333, 352, 429; 359/464, 359/627, 351, 462, 678, 754, 725, 729–731; 348/14.07, 24, 14.04, 335, 340, 369
See application file for complete search history.

(56) References Cited

U.S. PATENT DOCUMENTS

| | | | | |
|---|---|---|---|---|
| 4,911,530 A * | 3/1990 | Lo | ............................ | 359/464 |
| 5,121,099 A * | 6/1992 | Hegg et al. | ................. | 340/461 |
| 5,349,403 A * | 9/1994 | Lo | ............................ | 396/324 |
| 5,473,474 A * | 12/1995 | Powell | ...................... | 359/725 |
| 5,715,489 A * | 2/1998 | Inaba | ......................... | 396/327 |
| 6,084,715 A | 7/2000 | Aoki et al. | .................. | 359/627 |
| 6,097,550 A * | 8/2000 | Kimura | ..................... | 359/729 |
| 6,166,866 A * | 12/2000 | Kimura et al. | ............. | 359/729 |
| 6,611,282 B1 * | 8/2003 | Trubko et al. | ................ | 348/36 |
| 6,646,818 B2 | 11/2003 | Doi | ............................ | 359/725 |
| 6,765,730 B2 * | 7/2004 | Takahashi | ................... | 359/727 |
| 7,253,833 B2 * | 8/2007 | Imoto | ......................... | 348/148 |

(Continued)

FOREIGN PATENT DOCUMENTS

CN   1591088 A   3/2005

(Continued)

OTHER PUBLICATIONS

Chinese Patent Office Action, mailed Oct. 19, 2007 and issued in the corresponding Chinese Patent Application.

(Continued)

*Primary Examiner*—Rochelle-Ann J Blackman
*Assistant Examiner*—Warren K Fenwick (57) ABSTRACT

The present invention provides a mobile camera optical lens system which assures a wide view angle by dividing a view angle into two or more view angles, and simultaneously achieves the thinness of the mobile camera optical lens system by providing separate off-axis lens systems respectively corresponding to the split view angles.

21 Claims, 11 Drawing Sheets

U.S. PATENT DOCUMENTS

| | | | |
|---|---|---|---|
| 2001/0010555 A1* | 8/2001 | Driscoll, Jr. | 348/335 |
| 2002/0008896 A1* | 1/2002 | Ishibe | 359/205 |
| 2002/0018295 A1* | 2/2002 | Okuyama et al. | 359/443 |
| 2004/0207936 A1* | 10/2004 | Yamamoto et al. | 359/819 |
| 2005/0111100 A1 | 5/2005 | Mather et al. | 359/464 |
| 2008/0231966 A1* | 9/2008 | Hendriks et al. | 359/666 |

FOREIGN PATENT DOCUMENTS

| | | |
|---|---|---|
| EP | 1 865 350 | 12/2007 |
| JP | 07-072384 | 3/1975 |
| JP | 08-292371 | 11/1996 |
| JP | 2002-116405 | 4/2002 |
| JP | 2003-140280 | 5/2003 |

OTHER PUBLICATIONS

German Office Action issued Feb. 18, 2009 by the German Patent Office.

* cited by examiner

FIG.1

(PRIOR ART)

FIG.2

(PRIOR ART)

FIG.3

(PRIOR ART)

THINNER MOBILE CAMERA OPTICAL LENS SYSTEM AND IMAGE FORMING METHOD USING THE SAME

BACKGROUND OF THE INVENTION

1. Field of the Invention

The present invention relates generally to a mobile camera optical lens system and, more particularly, to a mobile camera optical lens system which assures a wide view angle by dividing an original view angle into a plurality of view angles and provides separate off-axis lens systems corresponding to the split view angles, thereby achieving a thinner mobile camera optical lens system.

2. Description of the Related Art

Recently, with the development of digital technology, the improvement of image compression, and the improvement of recovery technology and the peripheral technology of multimedia products, research into accomplishing the thinness and miniaturization of the mobile camera lens is being conducted. In order to meet such a tendency, cameras having high portability on thinner camera lens optical systems as well as excellent performance have been required.

Figure 1:
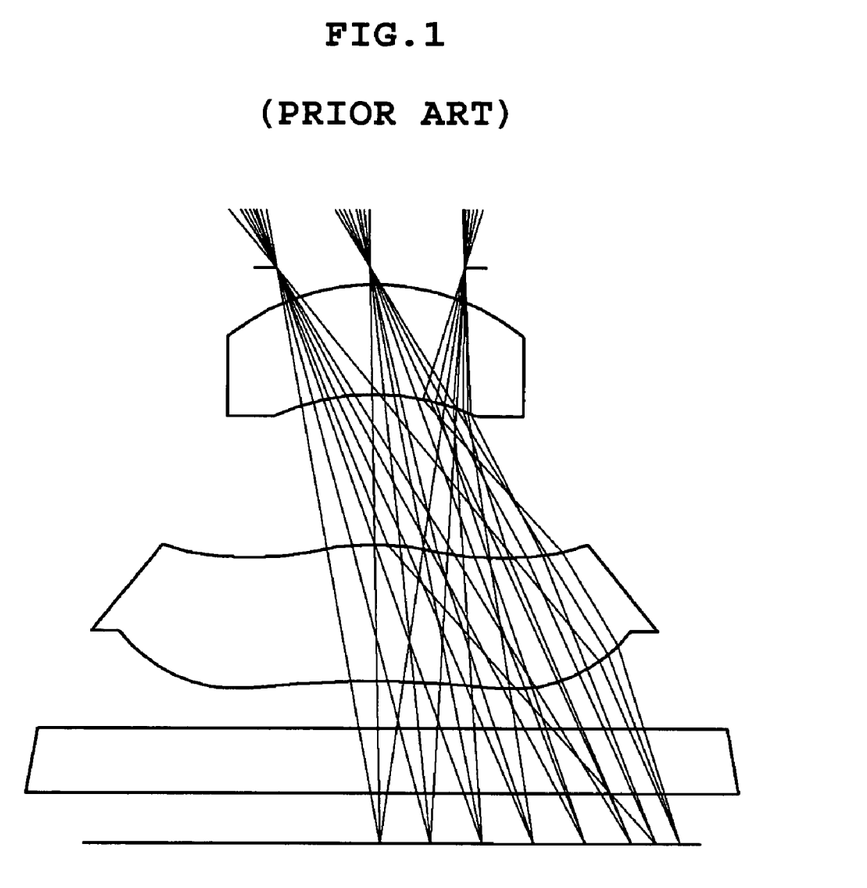
FIG. 1 is a diagram illustrating a conventional coaxial optical system.

Conventionally, a coaxial camera lens system, in which a plurality of rotation symmetry-type lenses is vertically arranged with respect to the direction of an optical axis, is generally used as an optical system lens for mobile cameras. Such a coaxial camera lens system is illustrated in FIG. 1. Referring to FIG. 1, the coaxial camera lens system generally has a limitation in the reduction of the length thereof in the direction of the optical axis thereof because several rotation symmetry-type lenses are vertically arranged. In particular, since the overall length of the mobile camera lens system is determined to be approximately the same as the diagonal length of an image sensor, there is a problem in that it is very difficult to achieve the miniaturization of a mobile device.

Therefore, in order to resolve such a problem, an optical lens system which achieves the miniaturization of a mobile device using a prism lens, and an optical lens system which achieves the miniaturization of a mobile device using a relay-type off-axis focusing lens, have been proposed.

Figure 2:
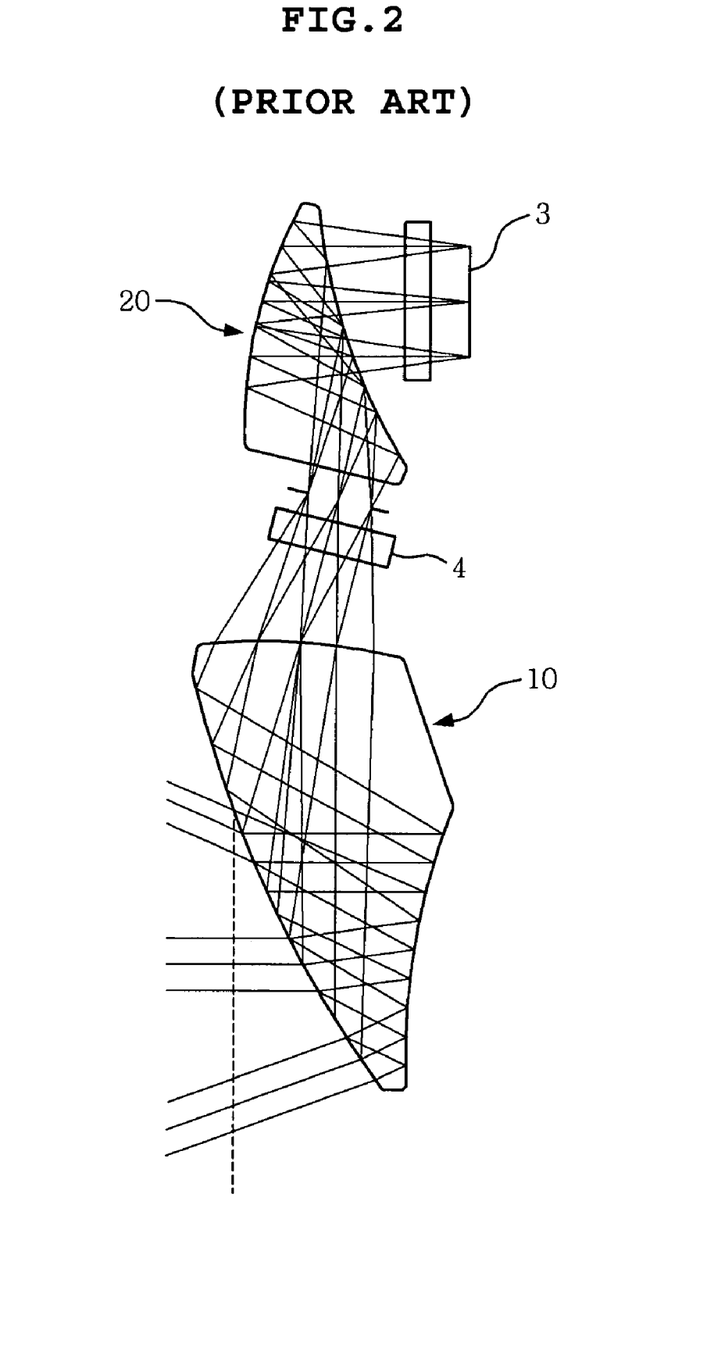
FIG. 2 is a diagram illustrating a conventional optical system using a prism lens.

U.S. Pat. No. 6,084,715 discloses an optical system using a prism lens, the construction of which is described with reference to FIG. 2. It can be seen that the mobile camera optical lens system includes a first prism 10, a second prism 20, a low-pass filter 4 and an image plane 3. However, as illustrated in the drawing, although the mobile camera optical lens system is constructed using a prism lens system, the ratio (overall length/diagonal length of image sensor) of the overall length of the optical system to the diagonal length of an image sensor falls within a range of 2.4 to 4.3, so that there is a limitation in the reduction of the overall length of the optical system.

Figure 3:
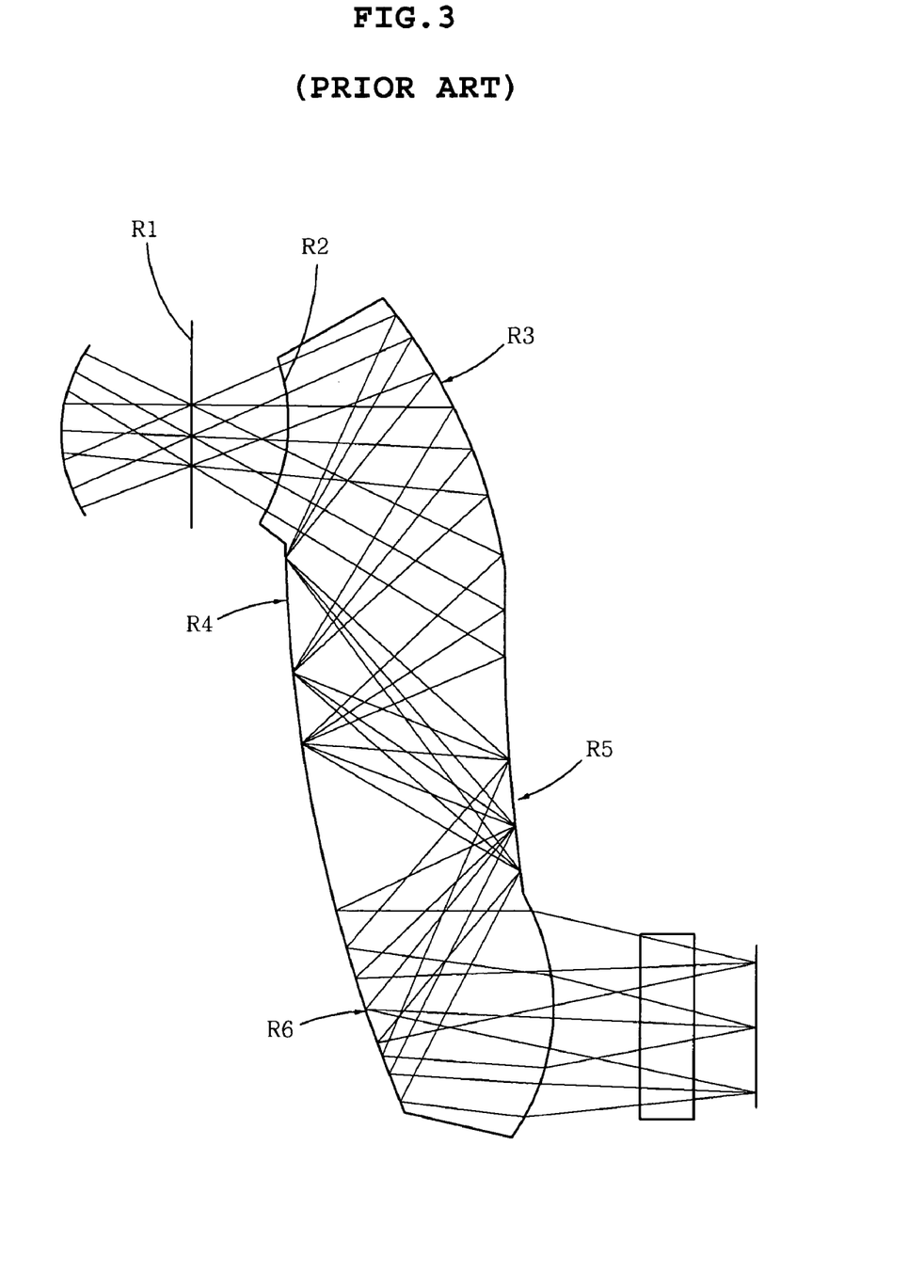
FIG. 3 is a diagram illustrating a conventional optical system using an integral prism lens.

As another example, Japanese Unexamined Patent Publication No. 2000-292371 discloses an optical system using an off-axis focusing lens, the construction of which is described with reference to FIG. 3. It can be seen that the mobile camera optical system includes a first surface R1, which is a diaphragm, a second surface R2, which is a refracting surface coaxial to the first surface, a third surface R3, which is a reflecting surface inclined with respect to the second surface R2, a fourth surface R4, a fifth surface, which is a reflecting surface shifted and inclined with respect to a corresponding surface, and a sixth surface R6, which is a refracting surface shifted and inclined with respect to the fifth surface R5.

However, even in the case of the integral off-axis focusing lens optical system, the ratio of the overall length of the optical system to the diagonal length of an image sensor (overall length/diagonal length of image sensor) falls within a range of 2.4 to 4.3, as described above. Although there is an advantage in that the length of an optical axis is shorter than that of a conventional coaxial camera lens system, as described above, there are considerable limitations in the achievement of a wide view angle on a single image sensor and, simultaneously, the reduction of the overall thickness of the optical system.

Furthermore, although, in the above-described conventional optical system, a method of reducing the overall thickness of the optical system by decreasing the size of the image sensor can be considered, the method also has few effects in that there is a limitation in the reduction of the size of the image sensor.

As a result, in order to implement a wide view angle using a single image sensor in a mobile camera optical lens system and, simultaneously, reduce the overall thickness of the optical system, an optical lens system, other than the above described lens system using the prism lens and the integral off-axis focusing lens system is required.

SUMMARY OF THE INVENTION

Accordingly, the present invention has been made keeping in mind the above problems occurring in the prior art, and an object of the present invention is both to assure a wide view angle by dividing a view angle into two or more angles and to reduce the overall length of an optical lens system by providing off-axis lens systems corresponding to the split view angles.

Another object of the present invention is to reduce manufacturing cost by decreasing the number of elements by integrating a plurality of off-axis lens systems, and to decrease the defective rate in an assembly process by integrating component lenses.

In order to accomplish the above object, the present invention provides a thinner mobile camera optical lens system, including two or more lens systems for passing light beams entering through two or more identical split view angles into which an view angle of the mobile camera optical lens system is divided, the lens systems corresponding to the split view angles; and a single image sensor for receiving the light beams passing through the two or more lens systems.

The division of the view angle is conducted by performing division such that light beams entering a mobile camera have different optical axes, and each of the lens systems is constructed as an off-axis lens system.

The lens systems are formed using injection molding, or are formed on wafer scale.

The single image sensor is divided to correspond to the number of the split view angles, so that light beams passing through the lens systems, form images on respective areas of the image sensor.

Additionally, the present invention provides a method of forming an image using a thinner mobile camera optical lens system, including dividing a view angle of a mobile camera optical lens system into two or more identical angles; passing light beams, entering through the split view angles, through respective lens systems corresponding thereto; forming the light beams, passing through the respective lens systems, on corresponding areas of an image sensor; and combining the images formed on the respective areas of the image sensor.

When the lens systems form inverted images, the images formed on the respective areas of the image sensor are combined using a photo stitching method or a panorama mosaic method.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Figure 4A:
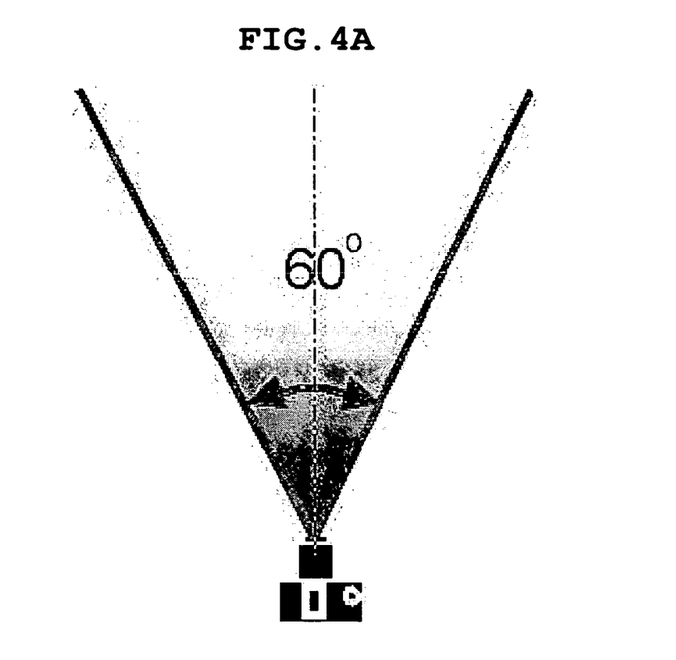
FIGS. 4A to 4C are diagrams illustrating the concept of view angle division according to the present invention.
Figure 4B:
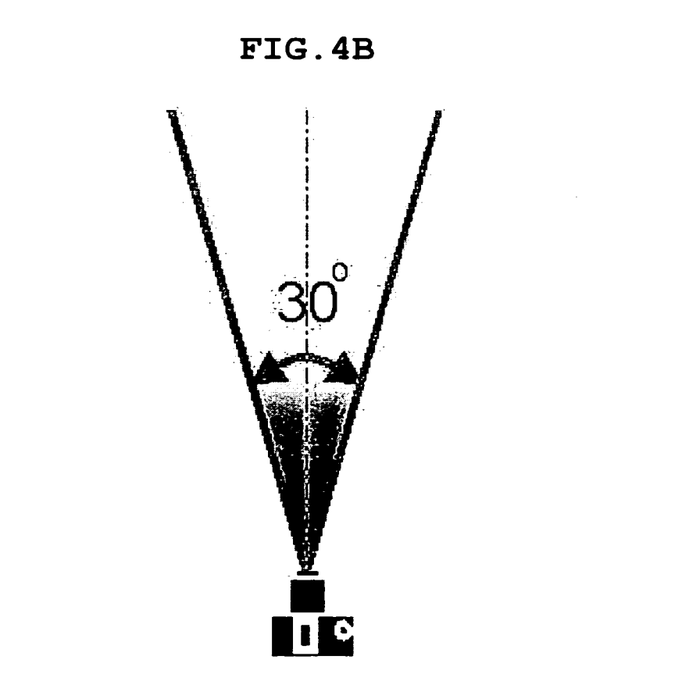
Figure 4C:
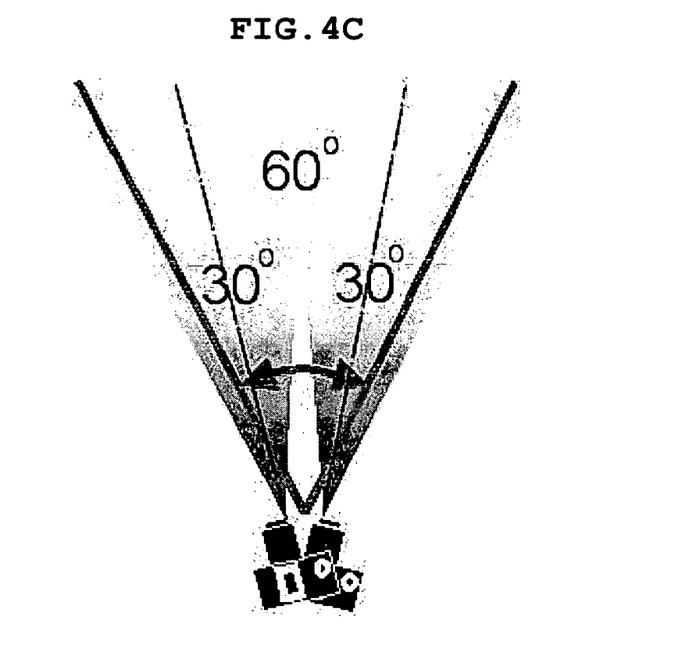
Figure 5A:
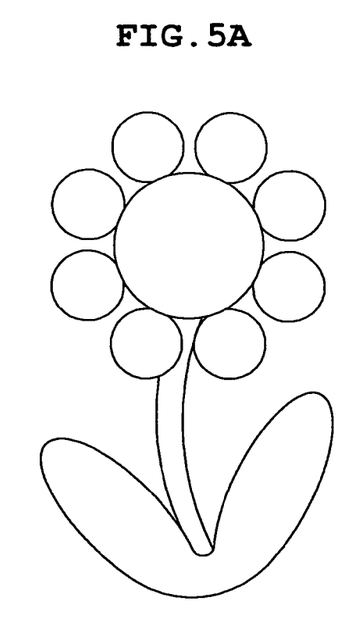
FIGS. 5A to 5D are diagrams illustrating an image forming method using an optical system according to the present invention.
Figure 5B:
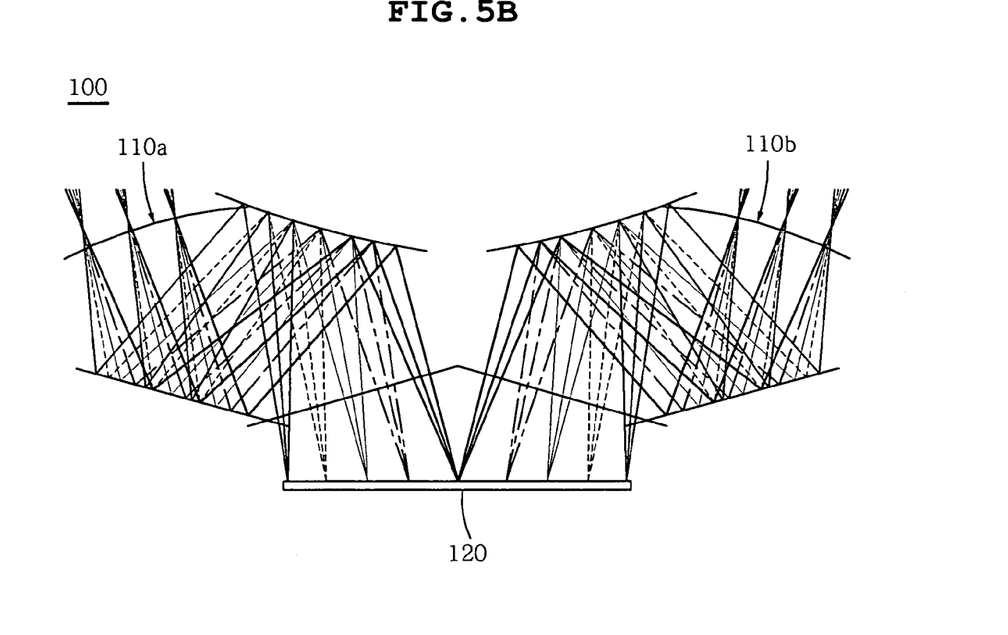
Figure 5C:
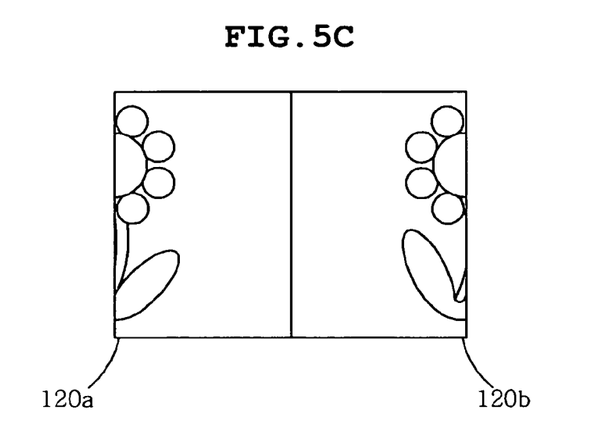
Figure 5D:
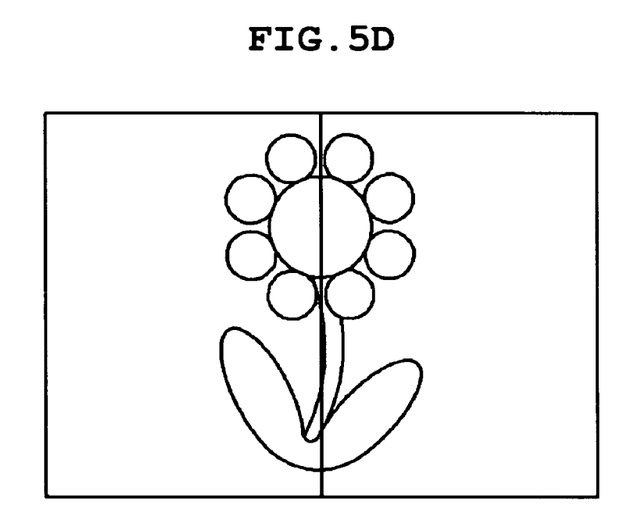
Figure 6:
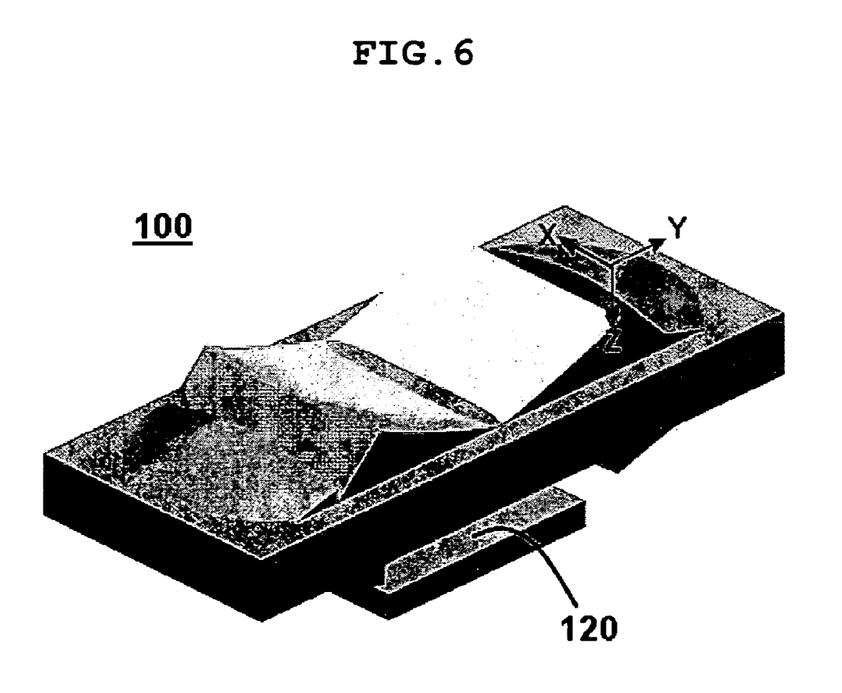
FIG. 6 is a perspective view illustrating a mobile camera optical lens system including two off-axis lens systems according to an embodiment of the present invention.
Figure 7:
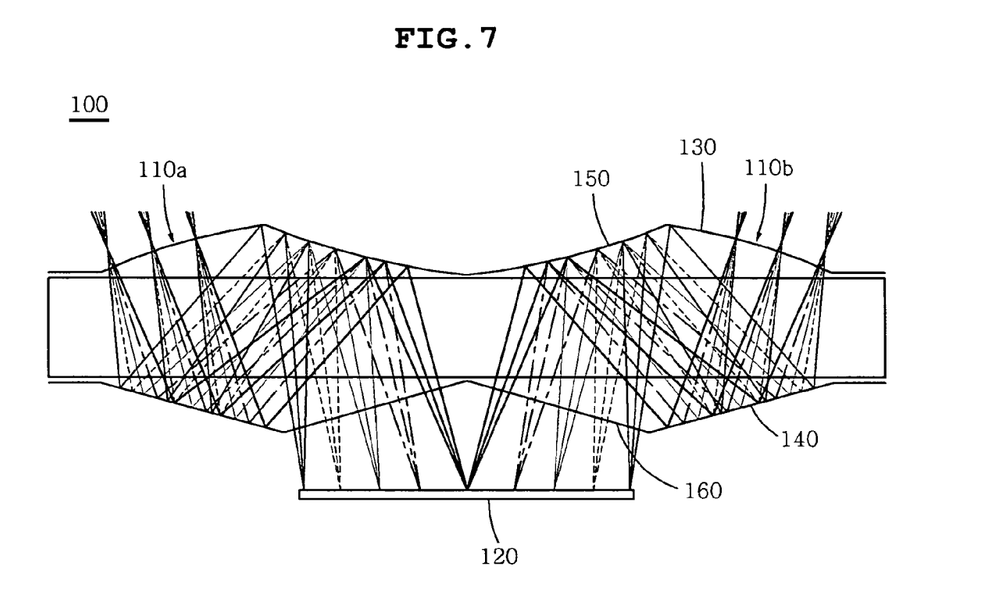
FIG. 7 is a diagram illustrating the sectional view of FIG. 6.
Figure 8:
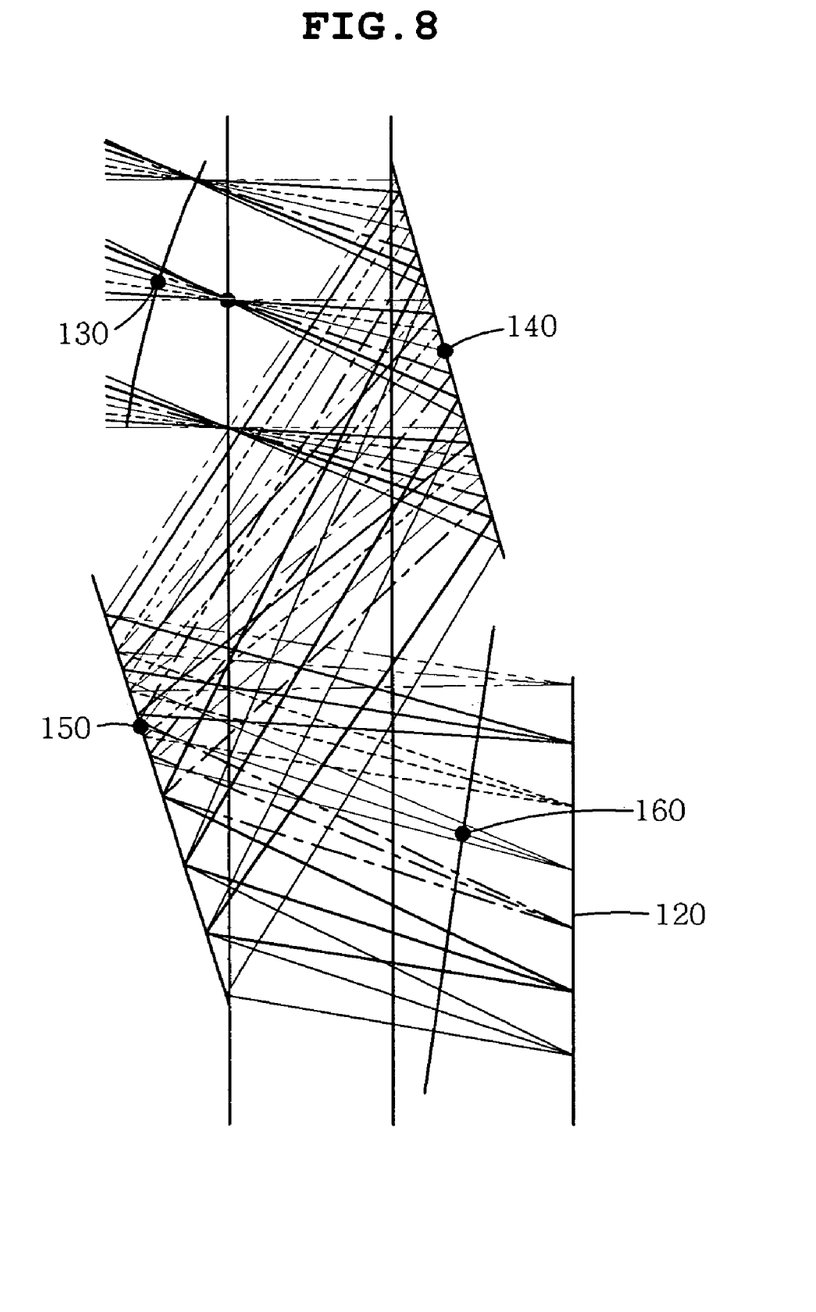
FIG. 8 is an enlarged view illustrating one of the off-axis lenses of FIG. 7.
Figure 9A:
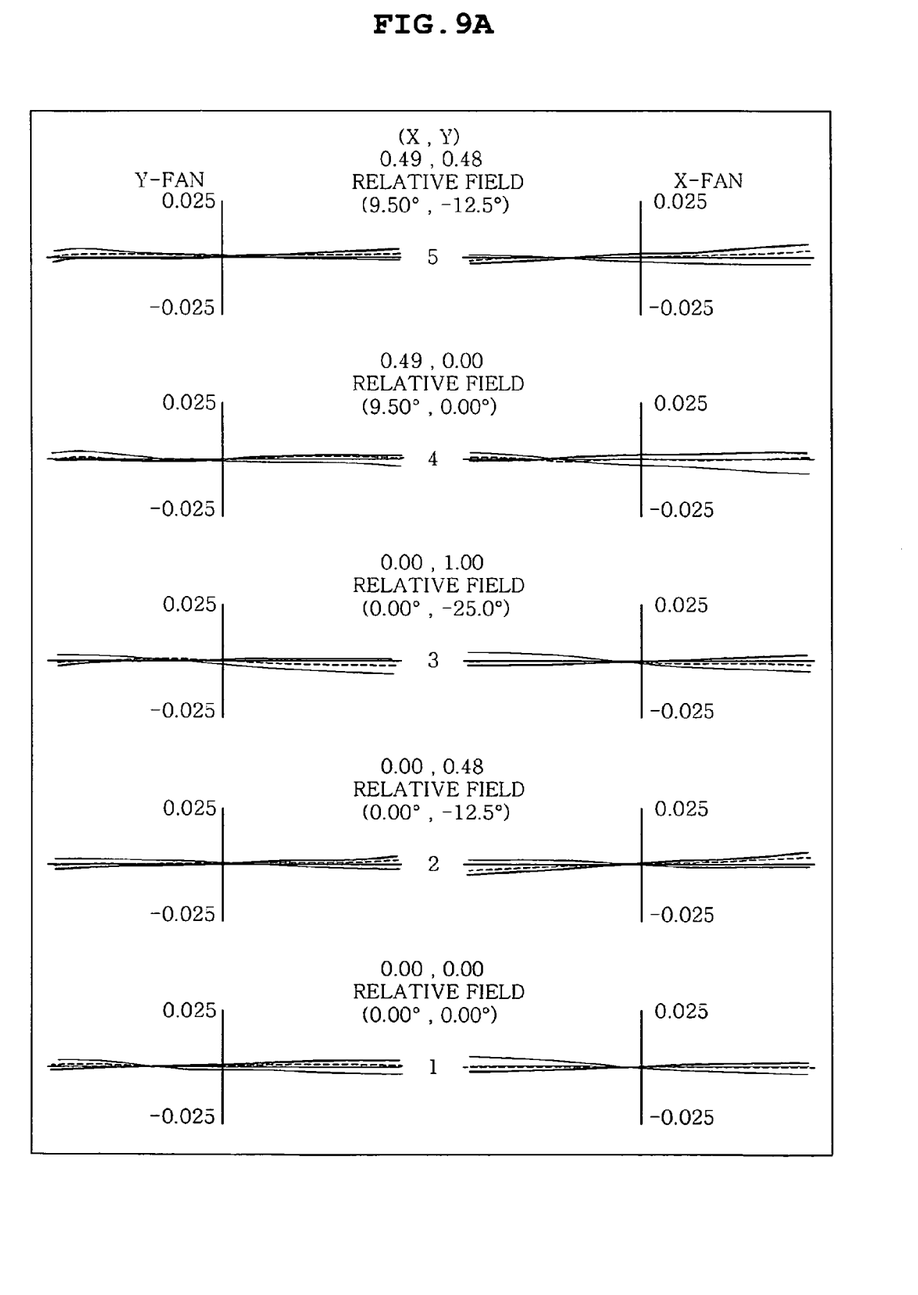
FIGS. 9A and 9B are transverse light aberration diagrams based on the same coordinates of the respective areas of the thinner mobile optical lens system according to the present invention.
Figure 9B:
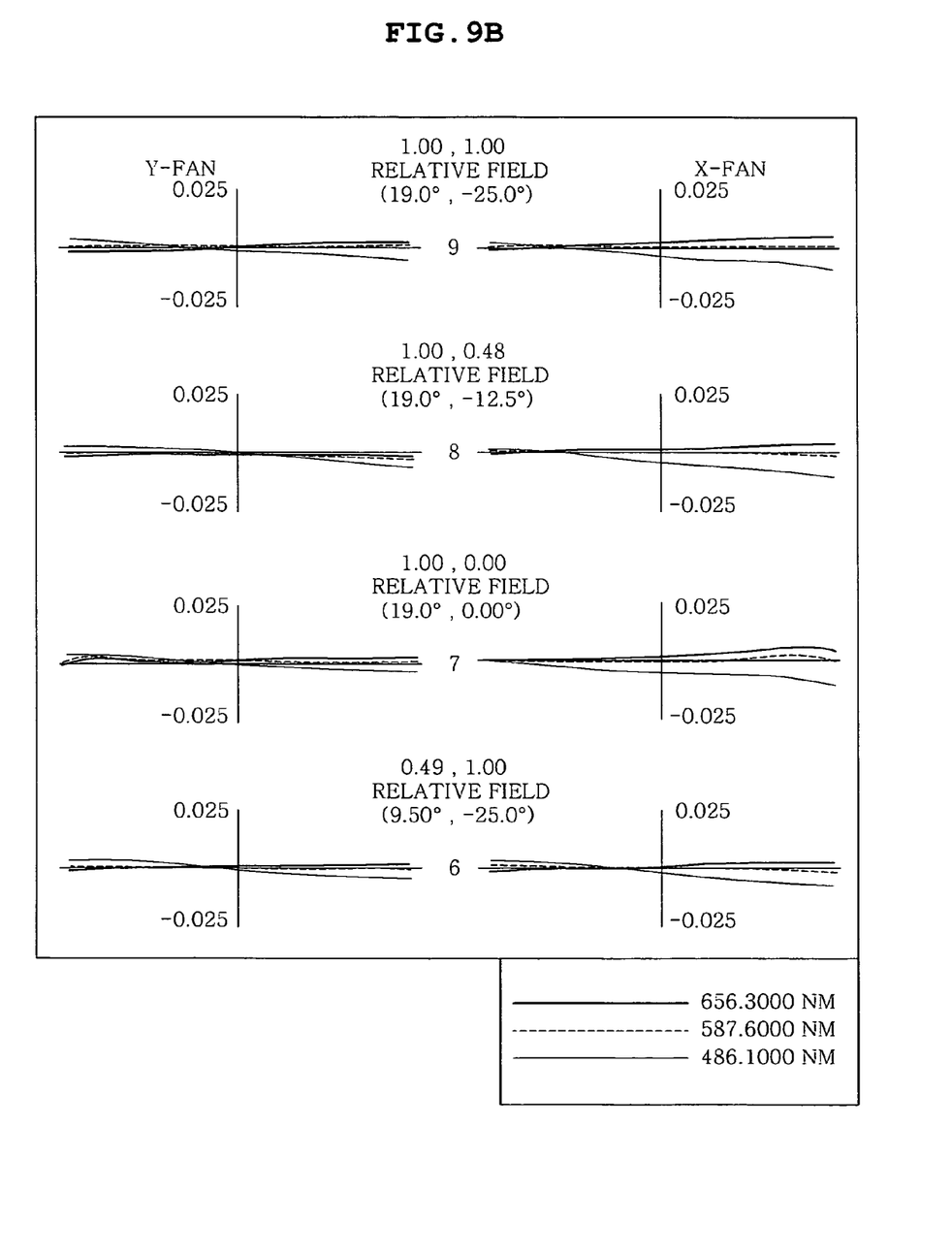

FIGS. 4A to 4C are diagrams illustrating a conventional camera and a camera having split view angles. FIGS. 5A to 5D are diagrams illustrating an image forming method using an optical system according to the present invention. FIG. 6 is a perspective view illustrating a mobile camera optical lens system including two off-axis lens systems according to an embodiment of the present invention. FIG. 7 is a diagram illustrating the sectional view of FIG. 6. FIG. 8 is an enlarged view illustrating one of the off-axis lenses of FIG. 7. FIGS. 9A and 9B are transverse light aberration diagrams.

As described above, the present invention has the technical features of keeping performance equal to or superior to that of a conventional coaxial camera optical lens system, a conventional camera optical lens system using a prism lens, and a conventional camera optical lens system using an integral off-axis lens, having a wide view angle, and of considerably decreasing the overall length of a camera optical lens system. In order to accomplish the technical features, the present invention needs to use a mobile camera optical lens system different from the above-described mobile camera optical lens systems.

That is, the method of decreasing the size of an image sensor itself is considered the most typical method of decreasing the overall length of a camera optical lens system. However, as described above, it is considerably difficult to decrease the size of the image sensor while maintaining a conventional optical system, so that, in the conventional optical system, it is known that the method does not efficiently decrease the overall length of the camera optical lens system.

However, the present invention provides an effect like decreasing the size of an image sensor by proposing a optical system, other than the above-described conventional optical systems, thereby accomplishing the reduction of the overall length of an optical system.

That is, the applicant has devised a thinner mobile optical lens system the basis that it is possible to substantially accomplish the effect of reducing the overall length of an optical system as long as the size of an image sensor itself decreases considerably, and to maintain the same size as a conventional image sensor by combining image sensors having decreased sizes with each order.

In particular, the present invention can implement the above-described thinner mobile optical lens system by dividing a view angle entering a camera optical lens system and providing separate lens systems corresponding to split view angles, thereby realizing the optical lens system different from the conventional optical lens systems.

First, in order to implement the optical lens system according to the present invention, it is required to divide the view angle of a camera. The concept of view angle division is described with reference to FIGS. 4A, 4B and 4C. FIG. 4A is a diagram illustrating the view angle (the case of about 60°) of a typical mobile camera optical lens system, which means an angle (viewing angle) at which a camera lens can capture an object. As conceptually illustrated FIGS. 4B and 4C, the view angle division indicates that, using a plurality of cameras having different optical axes and narrow angles as illustrated in FIG. 4B, an original view angle 60° is achieved by maintaining the respective split view angles thereof at about 30°, as illustrated in FIG. 4C. In particular, it can be seen that a process of acquiring half images from the cameras having different optical axes and then combining the images using a separate program is required.

That is, the process of acquiring the image of an object using a mobile camera and the concept of dividing a view angle according to the present invention is briefly described with reference to FIG. 5. The view angle of the image of the object illustrated in FIG. 5A is divided into view angles of about 30°. Therefore, the approximate halves of the image of the object are respectively incident on a plurality of mobile optical lens systems 100 according to the present invention illustrated in FIG. 5B, through the respective the split view angles. Light beams entering through the respective split view angles respectively pass through a first off-axis lens system 110a and a second off-axis lens system 110b respectively corresponding to the split view angles. The light beams passing through the respective off-axis lens systems 110 form images on the areas of a corresponding image sensor 120.

That is, the light beams, having passed through the first off-axis lens system 110a, form an image on the area of the image sensor portion 120a of the image sensor 120, and the light beams, having passed through the second off-axis lens system 110b, form an image on the area of the image sensor portion 120b of the image sensor 120. The case in which the image of the object is formed on the image sensor 120 through the above-described process is illustrated in FIG. 5C. As described above, the present invention divides a view angle and has two or more separate lens systems having different optical axes, so that the sizes of respective image sensor portions 120a and 120b corresponding thereto considerably decrease, thereby considerably decreasing the overall thickness of the optical lens system.

In this embodiment, the half images of the object illustrated in FIG. 5C are formed on respective image sensor portions 120a and 120b, so that a process of combining the respective images into one is required. In this embodiment, in the case in which the two lenses form an inverted image, the two images are combined into one image as illustrated in FIG. 5B using a photo stitching method or a panorama mosaic method. Meanwhile, in the case in which the two lenses form an erect image, it is possible to combine the respective images through the fine adjustment of the lenses.

The thinner mobile camera optical lens system 100 according to the present invention, which is formed according to the above-described concept, is described in detail with reference to FIGS. 6 and 7. The present invention is characterized as a thinner mobile camera optical lens system including two or more lens systems 110a and 110b for passing light beams, entering through a view angle range that has been divided into two or more, and a single image sensor 120 for receiving the light beams which have passed through the two or more lens systems 110a and 110b.

In the drawings, the case in which light beams entering through the split angles are respectively incident on the first off-axis lens system 110a and the second off-axis lens system 110b is illustrated. The division of the view angle is accomplished by dividing light beams received by the mobile camera and having different optical axes. Furthermore, the present invention uses a plurality of lens systems as illustrated in the drawings. It is difficult to technically implement the present invention using a conventional coaxial system, so the technical object is achieved using an off-axis lens system Although, in this embodiment of the present invention, the view angle is divided into two, and two off-axis lens systems 110 corresponding thereto are used, the present invention is not limited to this number, and, if required, the view angle can be divided into more than this number. In this case, the number of off-axis lens systems also increases. The above-described division of the view angle is another technical advantage of the present invention for realizing the wide view angle of the mobile camera.

In particular, as in the present invention, in a case in which a lens system is constructed using a plurality of lenses having small view angles, there are advantages in that an area on which an image is formed decreases to the size of the area/N (the number of lenses) and the view angles become smaller, thereby having an advantage in design. Furthermore, the present invention has technical advantages in that it is possible to implement a view angle the same as or larger than the view angle of a conventional lens by combining the plurality of lenses, and to implement an optical system having a shorter length using an image sensor having the same size.

The construction of the off-axis lens system 110 according to the present invention is described in detail. In an embodiment of the present invention, each of the off-axis lens systems 110 includes four lens surfaces 130, 140, 150 and 160, thereby forming one off-axis lens system. In the case in which two off-axis lens systems are included, as in the embodiment of the present invention, the two off-axis lens systems 110a and 110b are formed to be symmetrical to each other. Furthermore, the off-axis lens system 100 according to the present invention may be integrally or separately formed using injection molding. Furthermore, the off-axis lens system 100 can be formed on the wafer scale, so that there is an advantage in that mass production is possible. As described above, the off-axis lens system 110 according to the present invention is integrally formed, so that there are advantages of decreasing a defect rate in an assembly process due to the simplification of the manufacturing process, and reducing costs by decreasing the number of elements.

FIG. 8 is an enlarged view illustrating one part of the off-axis lens systems 110 according to the present invention. The characteristics of the respective lenses of the off-axis lens systems 110, according to the present invention, are described with reference to FIG. 8. The respective lens surfaces 130, 140, 150 and 160, as described above, have technical features of being formed using XY polynomial free-form surfaces satisfying the following Equation 1:

$$z = \frac{cr^2}{1 + SQRT[1 - (1+k)c^2r^2]} + \sum_{j=2}^{\infty} C_j x^m y^n, \quad (1)$$

$$\text{where } j = [(m+n)^2 + m + 3n]/2 + 1$$

In this case, z axis is the axis of the free-form surface, c is a vertex curvature, k is a conic constant, and $C_j$ (where j is an integer equal to or greater than two) is a coefficient.

The lens surfaces of the off-axis lens systems 110 according to the present invention are not only limited by XY polynomial free-form surfaces, i.e. it is possible for them to be formed using other equations of free-form surfaces.

In the following Table 1, the coefficients of the XY polynomial free-form surfaces and aliases are given.

TABLE 1

| coefficient | alias | definition |
|---|---|---|
| C1 | K | conic constant |
| C2 | X | x |
| C3 | Y | y |
| C4 | X2 | x2 |
| C5 | XY | xy |
| C6 | Y2 | y2 |
| C7 | X3 | x3 |
| C8 | X2Y | x2y |
| C9 | XY2 | xy2 |
| C10 | Y3 | y3 |
| C11 | X4 | x4 |
| C12 | X3Y | x3y |
| C13 | X2Y2 | x2y2 |
| C14 | XY3 | xy3 |
| C15 | Y4 | y4 |
| C16 | X5 | x5 |
| C17 | X4Y | x4y |
| C18 | X3Y2 | x3y2 |
| C19 | X2Y3 | x2y3 |
| C20 | XY4 | xy4 |
| C21 | Y5 | y5 |
| C22 | X6 | x6 |
| C23 | X5Y | x5y |
| C24 | X4Y2 | x4y2 |
| C25 | X3Y3 | x3y3 |
| C26 | X2Y4 | x2y4 |
| C27 | XY5 | xy5 |
| C28 | Y6 | y6 |

Furthermore, the respective lens surfaces 130, 140, 150 and 160 of the off-axis lens system 110, illustrated in FIG. 8, are designed to have values disclosed in the following Table 2. That is, the following Table 2 represents the central coordinates, gradients of the respective lenses, and the aspheric coefficients of related surfaces. In this case, the location of (0,0,0), which is a reference, is a stop surface.

TABLE 2

| | | Surface number | 130 | 140 | 150 | 160 |
|---|---|---|---|---|---|---|
| Coordinates and angle of surface | | X | 0.00000E+00 | 0.00000E+00 | 0.00000E+00 | 0.00000E+00 |
| | | Y | 6.42630E−02 | −2.41286E−01 | −1.74336E+00 | −1.96675E+00 |
| | | X | −2.43400E−01 | 9.50000E−01 | −2.50000E−01 | 9.50000E−01 |
| | | Tilt (α) | −1.48415E+01 | 1.84253E+01 | 1.87947E+01 | −1.26992E+01 |
| Radius of curvature | | Radius | 4.57144E+00 | −2.20745E+01 | −5.00907E−13 | −8.64656E+00 |
| Spherical coefficient | C1 | K | −1.75053E+00 | 2.91151E+01 | −2.51353E+91 | 1.90463E+01 |
| | C2 | X | 0.00000E+00 | 0.00000E+00 | 0.00000E+00 | 0.00000E+00 |

TABLE 2-continued

| Surface number | | 130 | 140 | 150 | 160 |
|---|---|---|---|---|---|
| C3 | Y | 0.00000E+00 | 0.00000E+00 | 0.00000E+00 | 0.00000E+00 |
| C4 | X2 | 5.69336E-02 | -6.07596E-04 | 5.23306E-03 | -8.18521E-02 |
| C5 | XY | 0.00000E+00 | 0.00000E+00 | 0.00000E+00 | 0.00000E+00 |
| C6 | Y2 | -3.05858E-02 | -1.63813E-02 | 4.29752E-03 | 7.66090E-02 |
| C7 | X3 | 0.00000E+00 | 0.00000E+00 | 0.00000E+00 | 0.00000E+00 |
| C8 | X2Y | -2.95966E-02 | -5.60715E-03 | 1.10974E-03 | -2.37374E-17 |
| C9 | XY2 | 0.00000E+00 | 0.00000E+00 | 0.00000E+00 | 0.00000E+00 |
| C10 | Y3 | -5.55772E-02 | -7.76890E-03 | -2.73073E-03 | 1.43137E-17 |
| C11 | X4 | 2.92112E-03 | -7.88758E-04 | -8.77107E-03 | -6.76493E-15 |
| C12 | X3Y | 0.00000E+00 | 0.00000E+00 | 0.00000E+00 | 0.00000E+00 |
| C13 | X2Y2 | -1.88050E-02 | -5.26944E-03 | -1.09814E-02 | -7.01269E-15 |
| C14 | XY3 | 0.00000E+00 | 0.00000E+00 | 0.00000E+00 | 0.00000E+00 |
| C15 | Y4 | -3.82760E-02 | -4.38029E-03 | -5.59673E-03 | -8.00638E-15 |
| C16 | X5 | 0.00000E+00 | 0.00000E+00 | 0.00000E+00 | 0.00000E+00 |
| C17 | X4Y | -1.37355E-04 | -5.04156E-03 | -5.54217E-03 | -2.63161E-02 |
| C18 | X3Y2 | 0.00000E+00 | 0.00000E+00 | 0.00000E+00 | 0.00000E+00 |
| C10 | X2Y3 | -3.21707E-02 | -6.22464E-03 | -1.08116E-03 | 1.44524E-02 |
| C20 | XY4 | 0.00000E+00 | 0.00000E+00 | 0.00000E+00 | 0.00000E+00 |
| C21 | Y5 | -3.08955E-02 | -1.85591E-03 | 1.08860E-03 | 7.14230E-04 |
| C22 | X6 | -1.37523E-02 | -2.04624E-03 | -3.76283E-03 | -8.53226E-03 |
| C23 | X5Y | 0.00000E+00 | 0.00000E+00 | 0.00000E+00 | 0.00000E+00 |
| C24 | X4Y2 | -5.01650E-02 | -3.03787E-03 | -3.44995E-03 | 1.27921E-02 |
| C25 | X3Y3 | 0.00000E+00 | 0.00000E+00 | 0.00000E+00 | 0.00000E+00 |
| C26 | X2Y4 | -5.93824E-02 | -4.50075E-03 | -1.06184E-02 | -9.23514E-02 |
| C27 | XY5 | 0.00000E+00 | 0.00000E+00 | 0.00000E+00 | 0.00000E+00 |
| C28 | Y6 | -1.05801E-02 | -5.18530E-04 | -1.33149E-03 | -5.56374E-03 |

Furthermore, the drawings illustrated in FIGS. 9A and 9B represent transverse light aberration diagrams based on the same coordinates for the respective areas of the thinner mobile camera optical lens system according to the present invention.

Each of the off-axis lens systems 110 including the respective lens surfaces 130, 140, 150 and 160 designed according to the above-described Tables 1 and 2 is described with reference to FIG. 7. Light beams entering based on the respective divided angles of a view angle pass through the incident surface 130 of each of the off-axis lens systems 110, are reflected off first and second reflection surfaces 140 and 150, pass through an exit surface 160, and reach an image sensor 120, thereby forming an image.

The image sensor 120 is divided into respective image sensor portions 120a and 120b so that they correspond to the number of split view angles and is constructed such that light beams passing through the plurality of off-axis lens systems 110 form images on the areas of the sensor portions of the image sensor. As described above, the present invention has technical characteristics in which the size of the image sensor is considerably decreased by dividing the image sensor to correspond to the respective split view angles, thereby considerably decreasing the size of the overall optical system, and in which a wide view angle is realized by dividing the view angle.

That is, using the optical lens system according to the present invention, the optical lens system can be constructed to satisfy the condition of L/ID≦0.6 (where L is overall length and ID is diagonal length of the image sensor)", so that there is an advantage of considerably decreasing the overall length, compared to a conventional coaxial optical system, a conventional integral off-axis lens system and a conventional optical system using a prism.

As described above, the method of forming an image through a thinner mobile camera optical lens system has technical features of including the steps of dividing a view angle of a mobile camera optical lens system into two or more identical angles; passing light beams, entering through the split view angles, through respective lens systems corresponding thereto; forming the light beams, passing through the respective lens systems, on corresponding areas of an image sensor; and combining the images formed on the respective areas of the image sensor, and, finally combining the images formed on the respective areas of the image sensor using a photo stitching method or a panorama mosaic method, thereby acquiring the image.

In the case of using a thinner mobile camera according to the present invention, as described above, there are advantages of assuring an wide viewing angle by dividing an view angle into two or more view angles, and, at the same time, considerably decreasing the overall length of an optical lens system by providing off-axis lens systems corresponding to the split view angles and considerably decreasing the sizes of image sensor portions corresponding thereto.

Additionally, the present invention has other advantages of reducing manufacturing cost by decreasing the number of elements in such a way as to integrally form a plurality of off-axis lens systems and decreasing the defect rate in an assembly process by integrating the component lenses.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A thinner mobile camera optical lens system, comprising:
   two or more lens systems to pass light beams entering through two or more identical split view angles into which an view angle of the mobile camera optical lens system is divided, the lens systems corresponding to the split view angles; and
   a single image sensor to receive the light beams passing through the two or more lens systems,
   wherein the lens systems are integrally or separately formed using injection molding, or are formed on wafer scale.

2. The thinner mobile camera optical lens system as set forth in claim 1, wherein the division of the view angle is conducted by performing division such that light beams entering a mobile camera have different optical axes.

3. The thinner mobile camera optical lens system as set forth in claim 1, wherein any one of the two or more lens systems is formed to include an incident surface on which light beams are incident, two reflecting surfaces, and an exit surface, the two reflecting surfaces being inclined relative to a reference axis.

4. The thinner mobile camera optical lens system as set forth in claim 1 or 3, wherein the two or more lens systems are formed to be symmetrical to each other.

5. The thinner mobile camera optical lens system as set forth in claim 1 or 3, wherein each of the lens systems is constructed using an off-axis lens system.

6. The thinner mobile camera optical lens system as set forth in claim 5, wherein the off-axis lens system has surfaces that are formed using XY polynomial free-form surfaces represented by the following equation:

$$z = \frac{cr^2}{1 + SQRT[1 - (1+k)c^2r^2]} + \sum_{j=2}^{\infty} C_j x^m y^n,$$

where $j = [(m+n)^2 + m + 3n]/2 + 1$ where z is an axis of the free-form surface, c is a vertex curvature, k is a conic constant, and $C_j$ (where j is an integer equal to or greater than two) is a coefficient.

7. The thinner mobile camera optical lens system as set forth in claim 1, wherein the single image sensor is divided to correspond to a number of the split view angles, so that light beams passing through the lens systems form images on respective areas of the image sensor.

8. The thinner mobile camera optical lens system as set forth in claim 7, wherein the images formed on the respective areas of the image sensor are combined using a photo stitching method or a panorama mosaic method.

9. A thinner mobile camera optical lens system comprising:
    two or more lens systems to pass light beams entering through two or more identical split view angles into which a view angle of the mobile camera optical lens system is divided, the lens systems corresponding to the split view angles; and
    a single image sensor to receive the light beams passing through the two or more lens systems,
    wherein the optical lens system satisfies the following condition:

$L/ID \leq 0.6$ where L is overall length and ID is diagonal length of the image sensor.

10. The thinner mobile camera optical lens systems as set forth in claim 9, wherein the division of the view angle is conducted by performing division such that light beams entering a mobile camera have different optical axes.

11. The thinner mobile camera optical lens system as set forth in claim 9, wherein any one of the two or more lens systems is formed to include an incident surface on which light beams are incident, two reflecting surfaces, and an exit surface, the two reflecting surfaces being inclined relative to a reference axis.

12. The thinner mobile camera optical lens system as set forth in claim 9 or 11, wherein the two or more lens systems are formed to be symmetrical to each other.

13. The thinner mobile camera optical lens system as set forth in claim 9 or 11, wherein each of the lens systems is constructed using an off-axis lens system.

14. The thinner mobile camera optical lens system as set forth in claim 13, wherein the off-axis lens system has surfaces that are formed using XY polynomial free-form surfaces represented by the following equation:

$$z = \frac{cr^2}{1 + SQRT[1 - (1+k)c^2r^2]} + \sum_{j=2}^{\infty} C_j x^m y^n,$$

where z is an axis of the free-form surface, c is a vertex curvature, k is a conic constant, and $C_j$ (where j is an integer equal to or greater than two) is a coefficient.

15. The thinner mobile camera optical lens system as set forth in claim 9, wherein the single image sensor is divided to correspond to a number of the split view angles, so that light beams passing through the lens systems form images on respective areas of the image sensor.

16. The thinner mobile camera optical lens system as set forth in claim 15, wherein the images formed on the respective areas of the image sensor are combined using a photo stitching method or a panorama mosaic method.

17. A method of forming an image using a thinner mobile camera optical lens system, comprising:
    dividing a view angle of a mobile camera optical lens system into two or more identical angles;
    passing light beams, entering through the split view angles, through respective lens systems corresponding thereto;
    forming the light beams, passing through the respective lens systems, on the corresponding areas of an image sensor; and
    combining the images formed on the respective areas of the image sensor,
    wherein the lens systems are integrally or separately formed using injection molding, or are formed on a wafer scale.

18. The method as set forth in claim 17, wherein the division of the view angle is conducted by performing division such that light beams entering a mobile camera have different optical axes.

19. The method as set forth in claim 17, wherein each of the lens systems is constructed using an off-axis lens system.

20. The method as set forth in claim 19, wherein the off-axis lens system has surfaces that are formed using XY polynomial free-form surfaces represented by the following equation:

$$z = \frac{cr^2}{1 + SQRT[1 - (1+k)c^2r^2]} + \sum_{j=2}^{\infty} C_j x^m y^n,$$

where $j = [(m+n)^2 + m + 3n]/2 + 1$ where z is an axis of the free-form surface, c is a vertex curvature, k is a conic constant, and $C_j$ (where j is an integer equal to or greater than two) is a coefficient.

21. The method as set forth in claim 17, wherein, when the lens systems form inverted images, the images formed on the respective areas of the image sensor are combined using a photo stitching method or a panorama mosaic method.

* * * * *

UNITED STATES PATENT AND TRADEMARK OFFICE
CERTIFICATE OF CORRECTION

PATENT NO. : 7,689,116 B2
APPLICATION NO. : 11/498782
DATED : March 30, 2010
INVENTOR(S) : Ho Sik You et al.

Page 1 of 1

It is certified that error appears in the above-identified patent and that said Letters Patent is hereby corrected as shown below:

Column 9, Line 53, change "systems" to --system--

Column 10, Line 10-12, change " ~~where+jSQRT[1+n)²1+h)c³r²]/2+~~ " to

$$z = \frac{cr^2}{1 + SQRT[1 - (1+k)c^2r^2]} + \sum_{j=2}^{\infty} C_j x^m y^n,$$

*where* $j = [(m + n)^2 + m + 3n]/2 + 1$

Column 10, Line 38, change "formed on a wafer scale." to --formed on wafer scale.--

Signed and Sealed this

Twenty-fourth Day of August, 2010

David J. Kappos
*Director of the United States Patent and Trademark Office*